(12) United States Patent
Li et al.

(10) Patent No.: US 8,467,322 B2
(45) Date of Patent: Jun. 18, 2013

(54) INBOUND CALL SCREENING FOR PARTICULAR ACCOUNTS

(75) Inventors: Chia-Chang Li, Holmdel, NJ (US); Jon Boone, Coatesville, PA (US); Jaime Jimenez, Tinton Falls, NJ (US); Chris Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 332 days.

(21) Appl. No.: 12/762,763

(22) Filed: Apr. 19, 2010

(65) Prior Publication Data
US 2011/0255447 A1 Oct. 20, 2011

(51) Int. Cl.
*H04L 12/16* (2006.01)
*H04Q 11/00* (2006.01)

(52) U.S. Cl.
USPC ............ 370/271; 709/212; 709/213; 715/733

(58) Field of Classification Search
None
See application file for complete search history.

(56) References Cited

U.S. PATENT DOCUMENTS

| | | | |
|---|---|---|---|
| 6,792,534 | B2 | 9/2004 | Medvinsky |
| 6,944,276 | B1 | 9/2005 | Nguyen et al. |
| 7,675,907 | B2 | 3/2010 | Nishida |
| 2003/0076941 | A1 | 4/2003 | Tiliks et al. |
| 2005/0201362 | A1* | 9/2005 | Klein et al. .................... 370/352 |
| 2005/0226223 | A1* | 10/2005 | Kaizawa et al. .............. 370/352 |
| 2007/0121855 | A1 | 5/2007 | Tiliks |
| 2007/0206731 | A1 | 9/2007 | Gruchala et al. |
| 2007/0268912 | A1 | 11/2007 | Guan |
| 2007/0286391 | A1 | 12/2007 | Gibson |
| 2008/0002665 | A1* | 1/2008 | Soo et al. ....................... 370/352 |
| 2008/0114678 | A1* | 5/2008 | Bennett et al. .................. 705/44 |
| 2010/0175112 | A1* | 7/2010 | Loeb et al. ......................... 726/4 |
| 2010/0268605 | A1* | 10/2010 | Waelbroeck et al. ...... 705/14.53 |

OTHER PUBLICATIONS

Written Opinion and International Search Report for PCT/US2010/031616 mailed Jun. 10, 2010, 12 pages.
Americas Headquarters Cisco Systems, Inc., "Cisco BTS 10200 Softswitch Operations and Maintenance Guide", Specification, Feb. 18, 2010, OL-1600-07, Release 6.0.x, Cisco Systems, Inc., San Jose, CA.
Americas Headquarters Cisco Systems, Inc., "Cisco BTS 10200 Softswitch Terminating White and Black List Feature Module", Jul. 31, 2009, pp. 1-4, Release 6.0.x, Cisco Systems, Inc., San Jose, CA.

* cited by examiner

*Primary Examiner* — Ayaz Sheikh
*Assistant Examiner* — Blanche Wong
(74) *Attorney, Agent, or Firm* — Banner & Witcoff, Ltd.

(57) ABSTRACT

A system and method for improving the handling, management, and retention of particular accounts. An allowable calling number list is generated via a suitable mechanism such as a call center. The allowable calling number list is utilized by telephone number management server to manage inbound call access to suspended accounts. Account representatives are given access to the suspended numbers. Additionally, certain emergency inbound calls may be permitted from select numbers.

20 Claims, 8 Drawing Sheets

Suspended Account Call Flow

INBOUND CALL SCREENING FOR PARTICULAR ACCOUNTS

FIELD OF THE DISCLOSURE

The features disclosed herein relate generally to network systems and methods and more particularly to devices, systems, and methods for call screening, redirection, and selected access for particular accounts.

BACKGROUND

When accounts are in particular states, such as the "Suspended" status, subscribers may be able to make only outbound calls to "911" or to call a predetermined customer care number manually programmed into the system. Accounts in the Suspended status cannot receive any incoming calls. In such situations, paper letters are sent to delinquent customers as the means of contacting the customers.

A problem arises in that a service provider's customer care agents or other employees, whose numbers typically change dynamically, may not be able to reach such subscribers by telephone. Further, certain critical alert calls from local police are often from contract companies and/or different departments within any number of local and/or federal government agencies, and may not reach such subscribers. Paper letters do not allow interactive discussion for better collection and retention results. There has been no mechanism to handle selective call admission, e.g., for suspended accounts.

SUMMARY

The following presents a simplified summary of the disclosed features in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Some embodiments of the disclosure provide mechanisms to easily manage deactivation and reactivation of end user accounts responsive to billing and other information. For example, when a change of status event occurs, a decision tree allows for various processing of the event. The status change may, for example, be when a payment from a user has not been received after an allotted time period. This event may be sent to the user via his phone, Internet, wireless link or other provider service and certain consequences may ensue. Most typically, the consequence is that the user's service is interrupted. However, this interruption prevents a user from effectively communicating with the service provider to negotiate payment plans or to reactivate the service. Where the user's inbound calls are blocked, the service provider is entirely dependent on the user calling the service provider or sending paper mail. This is problematic where the user stays passive or has decided to switch services. In these situations, it is desirable for the service provider to be able to call the user and initiate contact. Additionally, where the issue is more complicated than simply calling a number and paying a bill, inbound calls are also desirable. For example, it may be a service issue that prompted the non-payment. Managing the allowable inbound calls in such a situation is more complicated because static and/or dynamic calling party lists need to be associated with the number.

Aspects of this disclosure provide a system, method, and networked device for managing and screening inbound calls from a selected set of numbers, locations, and organizations to go through to an account that has been suspended or otherwise deactivated and to easily manage the list of allowable callers in a centralized manner.

BRIEF DESCRIPTION OF THE DRAWINGS

A more complete understanding of the disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the disclosure.

The disclosed embodiments enable service providers, call centers, customer service agents, contracted third parties, and/or certain emergency agencies to call a suspended or otherwise deactivated account. The disclosure provides examples of configurations for network elements and logic flows to support such functionality.

Figure 1:
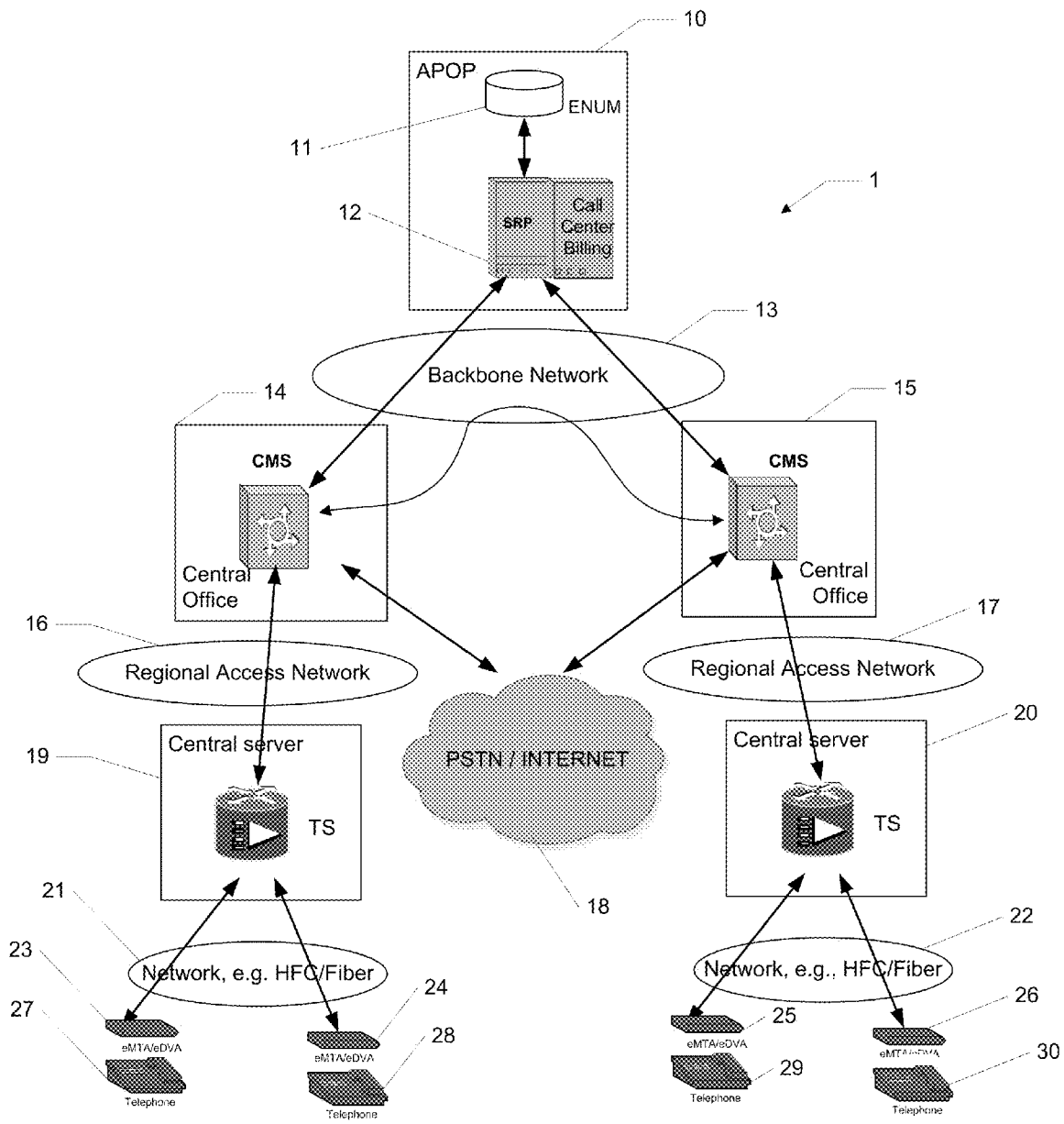
FIG. 1 is a block diagram of an exemplary embodiment of a network system for implementing call flows associated with selective call admission.

FIG. 1 illustrates a first exemplary embodiment of a network system 1. An application point of presence (APOP) 10 may include any number of components such as a telephone number management server, e.g., an ENUM server 11, and a Signal Route Proxy Server, e.g., a SIP Route Proxy (SRP) server 12. The APOP may be connected to network 13 such as the Internet and/or a backbone network. The APOP may itself contain a billing server and/or call center and/or may be connected to a billing server and/or call center over various networks such as the Internet and/or a backbone network 13. The SRP may be coupled through the network 13 to a call management server (CMS) 14, 15. The CMS 14, 15 may be variously located such as in a centralized office location and/or in other locations. Further, there may be any number of CMSs in the system which may be stand alone, interconnected directly, and/or connected to or interconnected via a PSTN and/or Internet 18. The CMS 14, 15 may be connected to a respective Termination System (TS) 19, 20 either directly and/or through a regional access network 16, 17. The TS 19, 20 may be located in any number of physical locations, such as at a centralized data center, other location. The TS 19, 20 may be coupled to a modem, eMTA/eDVA 23-26, and/or a telephone 27-30, either directly and/or through a Network 21, 22 such as wireless network, a coax cable network, a fiber optic network and/or a hybrid fiber coax network, wireless, twisted pair, and/or another type of network.

In a service provider's system, customer care agents can put an account in a "Suspended" administrative status when the account is delinquent, for example. Customer care agents may be service provider's employees and/or may be outside contract employees whose numbers typically change dynamically. For example, where the customer care employees are working from home or remote offices, those employees are typically linked into the customer care system via a call center. As the customer care agents and/or contract employees change, the numbers change in the call center.

Further, emergency-type alert calls, from local police for example, are often from contract companies and/or different departments within a local government agency. Consequently, these numbers also dynamically change.

It is desirable that a service provider's customer care agents or any other provider-designated agents (e.g., emergency alert provider's, for example), having the ability to originate calls from a variable set of phone numbers, can still make calls to these suspended accounts, to discuss the account status and/or provide emergency alerts, for example. This communication capability increases both the collection and retention of the delinquent accounts.

One method to implement such capability is to utilize a termination attempt trigger on CMS in an implemented infrastructure, such as a SIP infrastructure. Instead of putting delinquent subscribers in the "SUSPENDED"-type status, which would prohibit all inbound calling, one type of the capabilities described herein keeps delinquent users in an "ACTIVE" status to allow inbound call processing. In addition, these subscribers may utilize a termination attempt trigger (TAT) that points to a SIP trunk-group to an appropriate server such as a SIP Route Proxy (SRP). Call processing of all the inbound calls to such suspended subscribers will invoke the trigger and send the calls to the SRP. The SRP, together with the ENUM server (or another type of telephone number management server), may be configured to function as the Suspend Inbound Call Screening (SICS) server to perform the screening function of inbound calling to the suspended subscribers.

A list of allowable calling numbers may be provisioned on an ENUM server as NAPTR records. One method of implementing this list is using a billing system to, for example, set the user's status (e.g., active, suspended, or delinquent) and a call center server to provide listings of allowable calling party numbers. If a calling number is on the list, the ENUM server may be configured to provide a positive response to the SRP and the SRP may be configured to return a well-formed SIP Invite back to the terminating switch for completion of the call to the suspended endpoint. If the calling number is not on the list, the ENUM server may respond with a URI including a dummy suspended DN at a CMS domain selected from a list of equally weighted forwarding CMS. The SRP may then be configured to handle the proxies server to send the SIP Invite according to the URI. The dummy suspended DN is an "actually suspended" DN which does not accept any inbound calls. A caller from a calling number not on the list typically will reach the dummy suspended DN on the forwarding CMS and will hear a suspend announcement.

Figure 2:
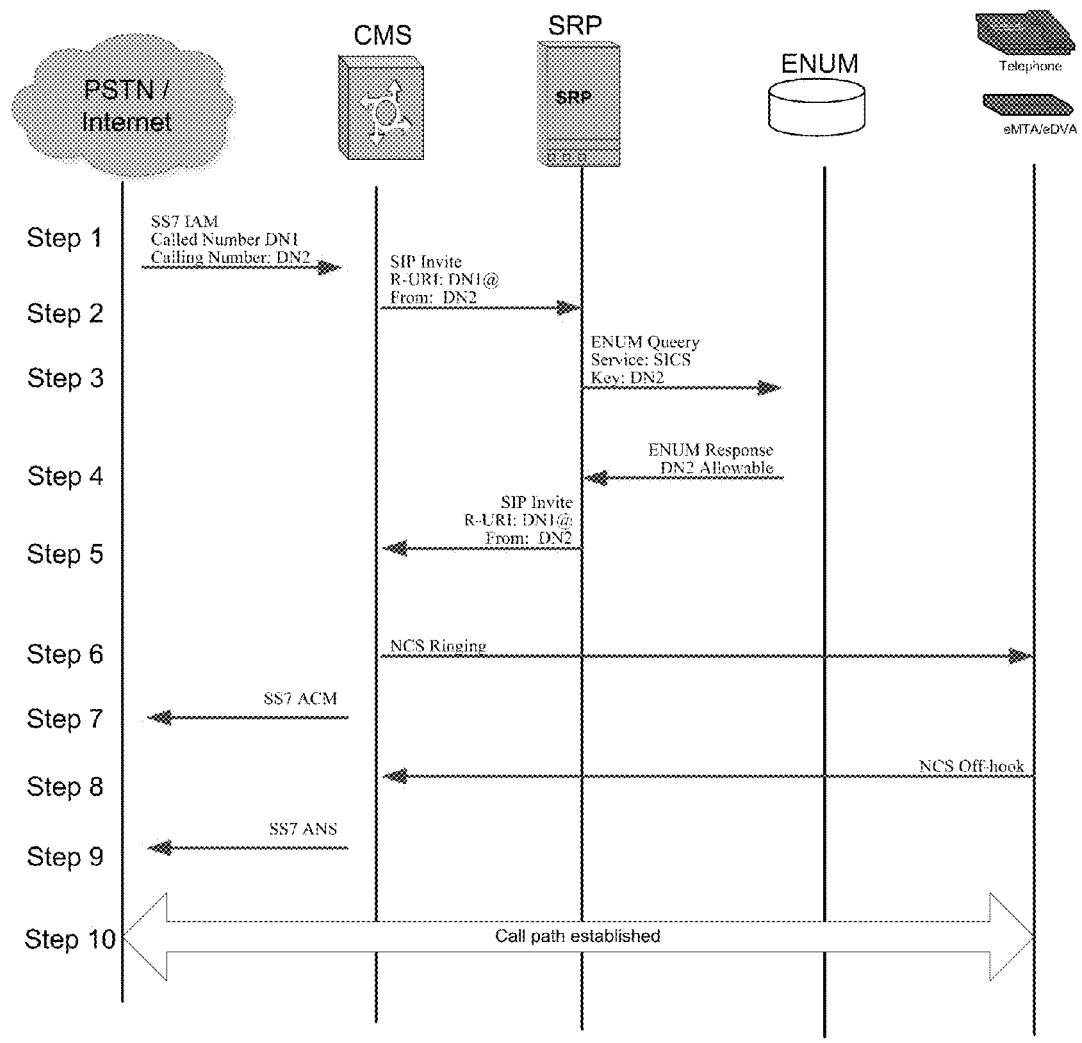
FIG. 2 illustrates an exemplary call flow for allowable calling numbers per a selective call admission policy.

FIG. 2 illustrates one exemplary call flow diagram for a call to a suspended subscriber number from an allowable calling party number. A DN 1 is a suspended subscriber number; a DN 2 is an allowable calling number. In Step 1, a call set-up message, such as a SS7 IAM message, is sent from the network 18 to the CMS 14. In Step 2, an invite message, such as a SIP invite containing R-URI: DN1@ and From: DN2 is sent from the CMS 14 to the SRP 12. In Step 3, a query, such as an ENUM Query containing Service: SICS and Key:DN2 parameters, is sent from the SRP 12 to the ENUM server 11. In Step 4, the ENUM server 11 returns an ENUM response with the parameter DN2 allowable after consulting the status of the account and the list of allowed numbers. In Step 5, the SRP 12 returns a SIP Invite, for example with parameters R-URI: DN1@ and From: DN2 to the CMS 14 indicating that the calling number is allowed, to the suspended account. In step 6, the NCS Ringing signal is sent between the CMS 14 and the eMTA/eDVA 23 and/or 27 telephone interface. In Step 7, the CMS sends back to the network 18 (e.g., a SS7 in the PSTN) a SS7 ACM signal. In Step 8, the telephone interface 27 and/or eMTA/eDVA 23 sends back a NCS Off-hook signal to the CMS. In step 9, the CMS sends back to the network 18 (e.g., a SS7 in the PSTN) a SS7 ANS (answer) signal. In Step 10, the call path is shown as being established.

Figure 3:
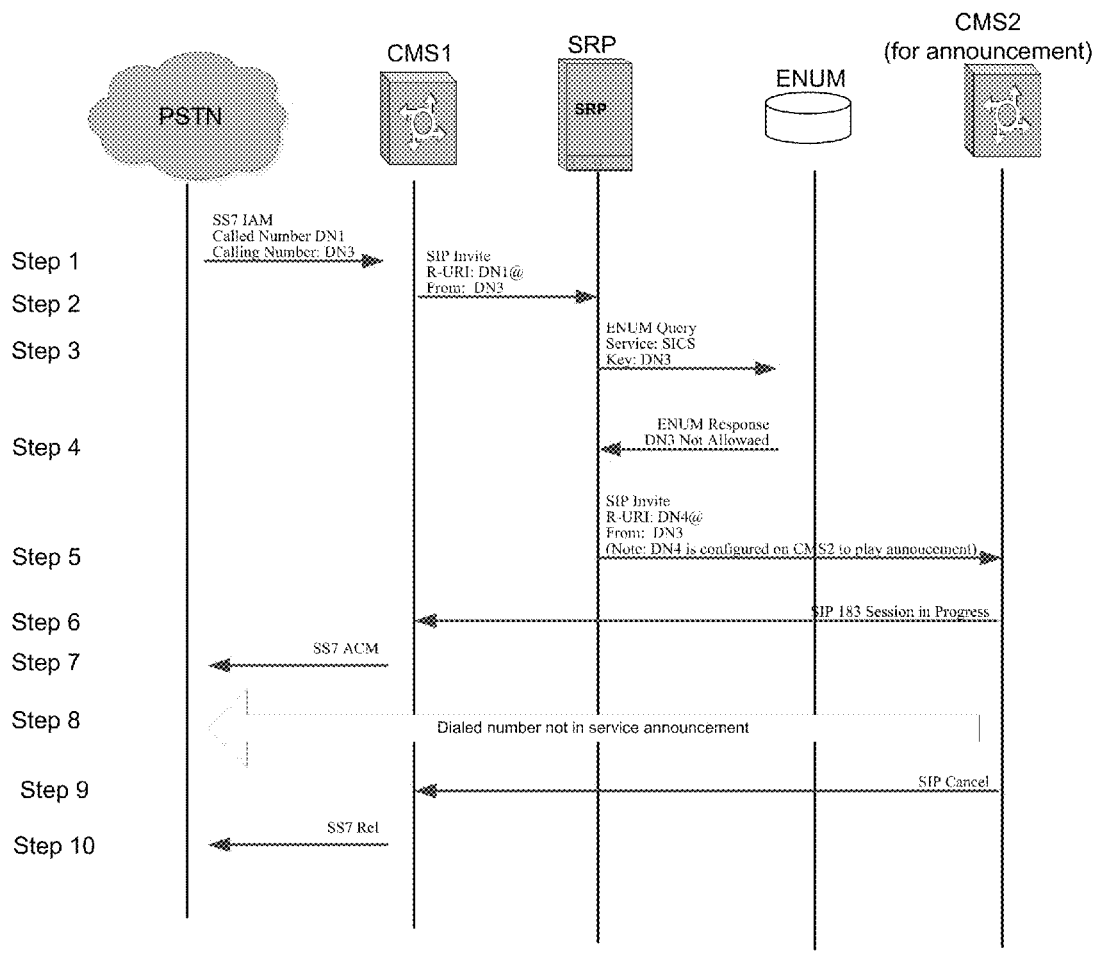
FIG. 3 illustrates an exemplary call flow for a disallowed calling number per a selective call admission policy.

FIG. 3 illustrates one exemplary call flow diagram for a call to a suspended subscriber number from a disallowed calling party number together with an optional sending of a "dialed number not in service" announcement message. In Step 1, call set-up message, such as a SS7 IAM message with parameters called number: DN1 and calling number DN2, is sent from the network 18 (e.g., a SS7 in the PSTN) to the CMS 14. In Step 2, an invite message, such as a SIP invite containing parameters R-URI: DN1@ and From: DN2, is sent from CMS 14 to the SRP 12. In Step 3, a query, such as an ENUM Query containing Service: SICS and Key:DN3 parameters, is sent from the SRP 12 to the ENUM server 11. In Step 4, the ENUM server 11 returns an ENUM response with the parameter DN3 Not Allowed after consulting and/or determining the status of the account and the list of allowed numbers. In Step 5, the SRP 12 sends a SIP Invite with parameters R-URI: DN4@ and From: DN3 to the CMS 15 which may be configured to play an announcement that the dialed number is not in service. In Step 6, the CMS 15 returns a SIP 183 Session in Progress message to the CMS 14. In Step 7, the CMS sends back to the network 18 (e.g., a SS7 in the PSTN) a SS7 ACM signal. In Step 8, the CMS2 sends back to the network 18 (e.g., PSTN) a message "Dialed number not in service announcement". In Step 9, the CMS 15 sends back to the CMS 14 a SIP Cancel signal. In Step 10, the CMS 14 sends back to the network 18 (e.g., a SS7 in the PSTN) a SS7 Rel message releasing the call. In Step 10, the CMS 14 sends a SS7 Release to the PSTN.

While the above call flow has been described in general terms, a more specific call flow is provided below which is particularly useful to minimize traffic congestion and better balance the overall network flow.

DETAILED EXAMPLE OF ONE EMBODIMENT

FIGS. 4-8 illustrate detailed examples of alternative embodiments implemented on a Call Management Server (CMS) using a SRP SICS server.

Figure 4:
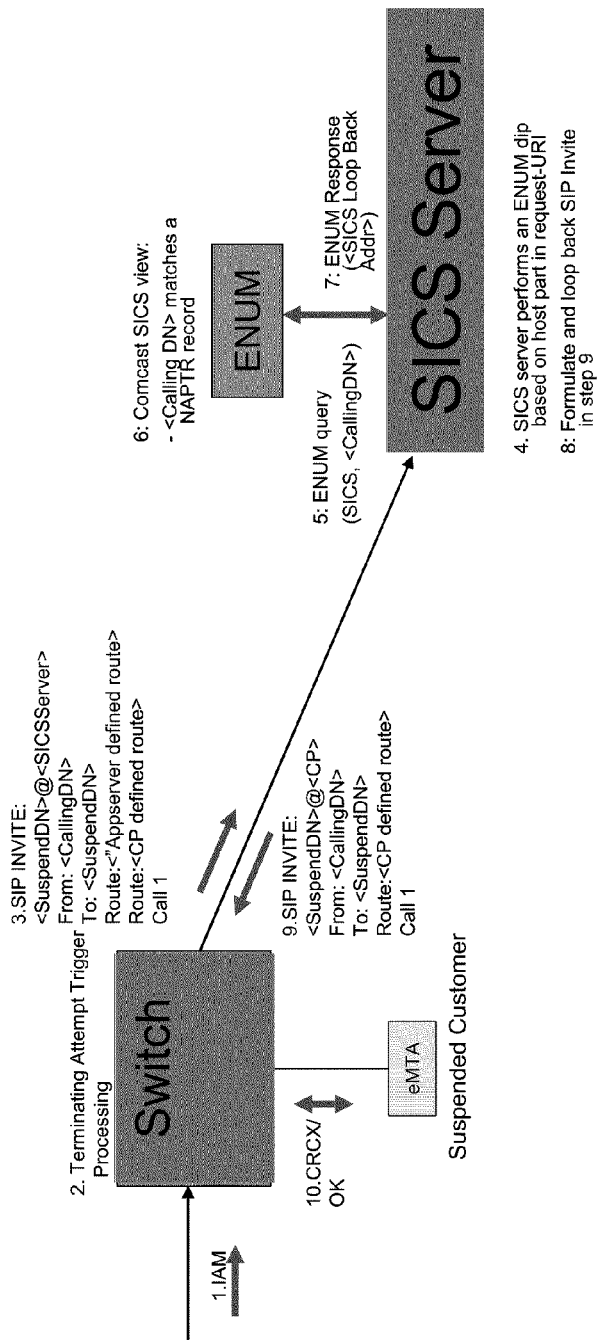
FIGS. 4-8 illustrate examples of call flows for use in a system such as the system shown in FIG. 1.
Figure 6:
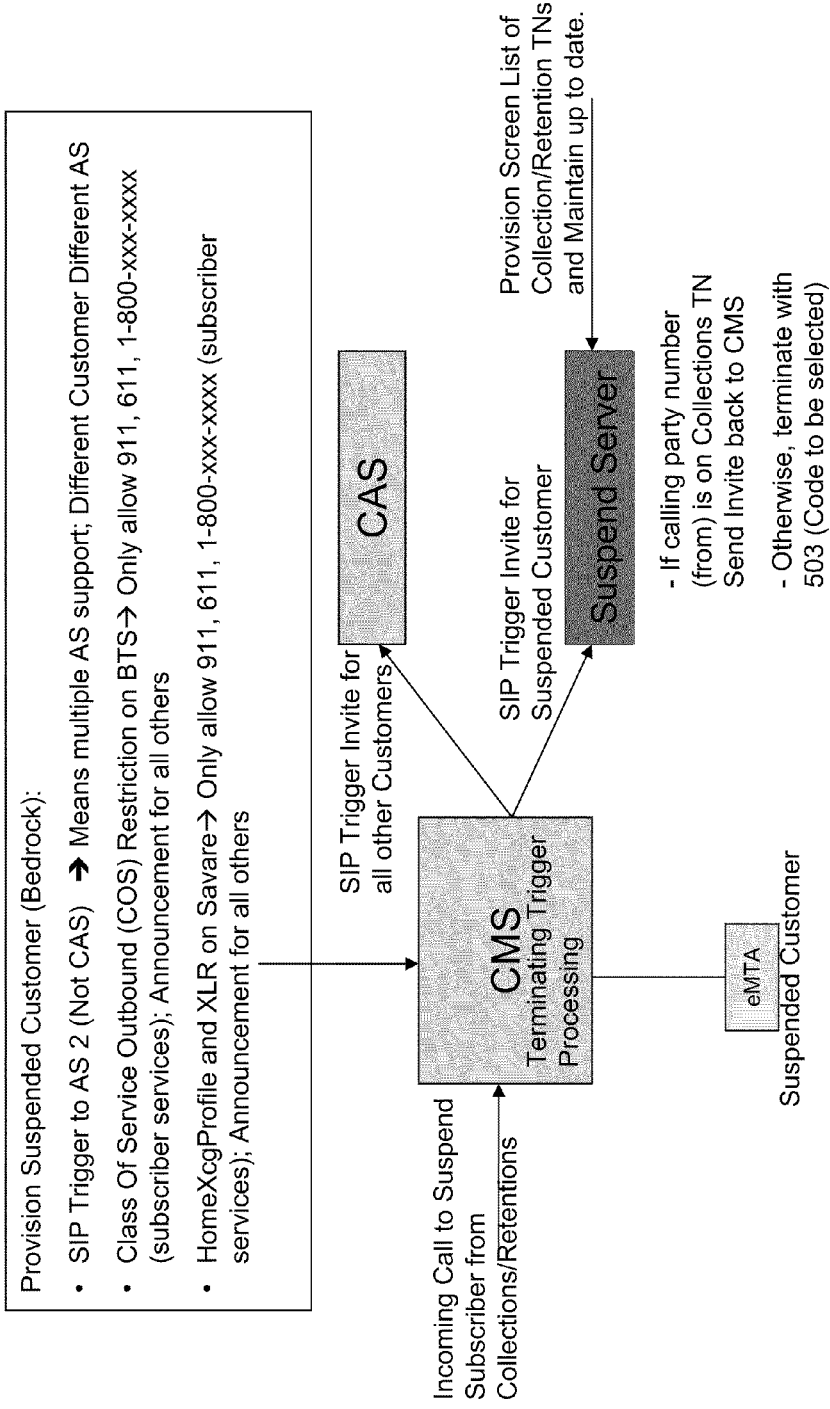

FIG. 4 provides an overview of a suspended account call flow. In this detailed example, the phone switch typically is configured to implement the policy associated with various suspended subscriber account. In this detailed example, a router (e.g., an Acme Packet Session Router) and a telephone number management server, such as an ENUM server, may be configured to provide an Application. In this mode the system acts as a proxy server, affecting call routing rather than as a Back-to-Back User Agent. An exemplary provisioning for this arrangement and a partial call flow is illustrated in FIG. 6.

Figure 5:
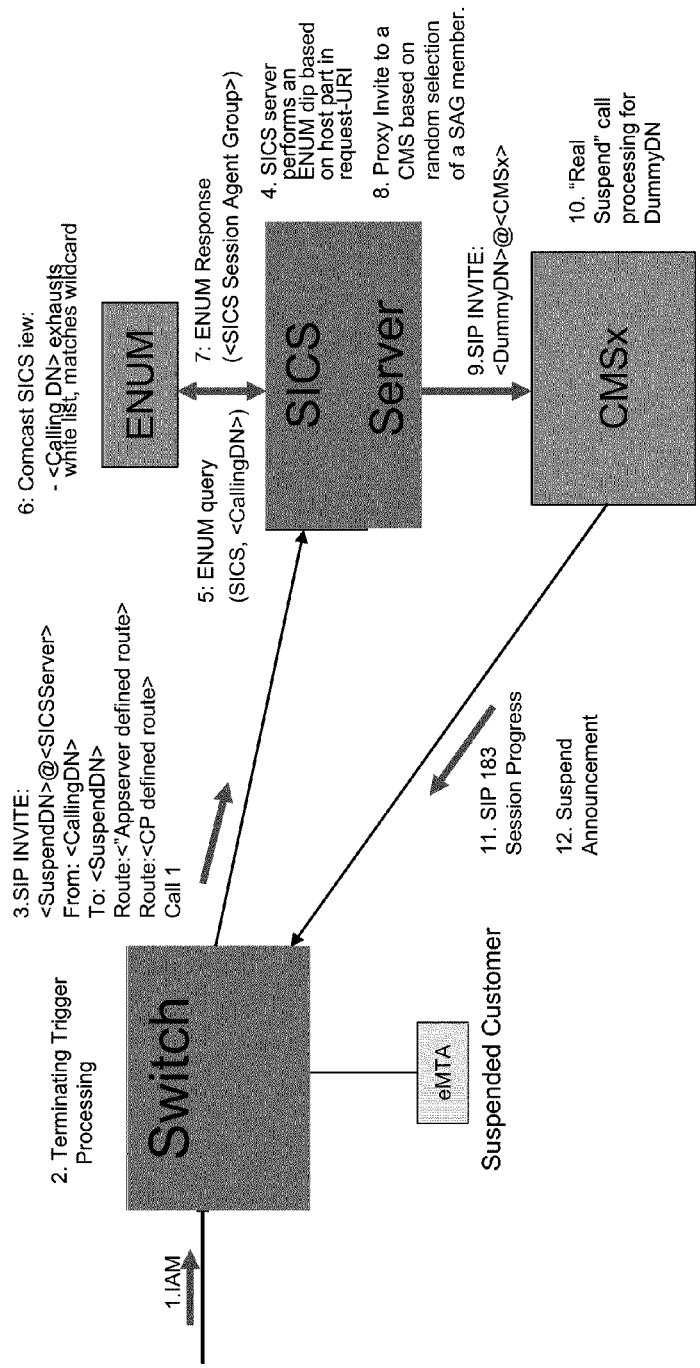
Figure 7:
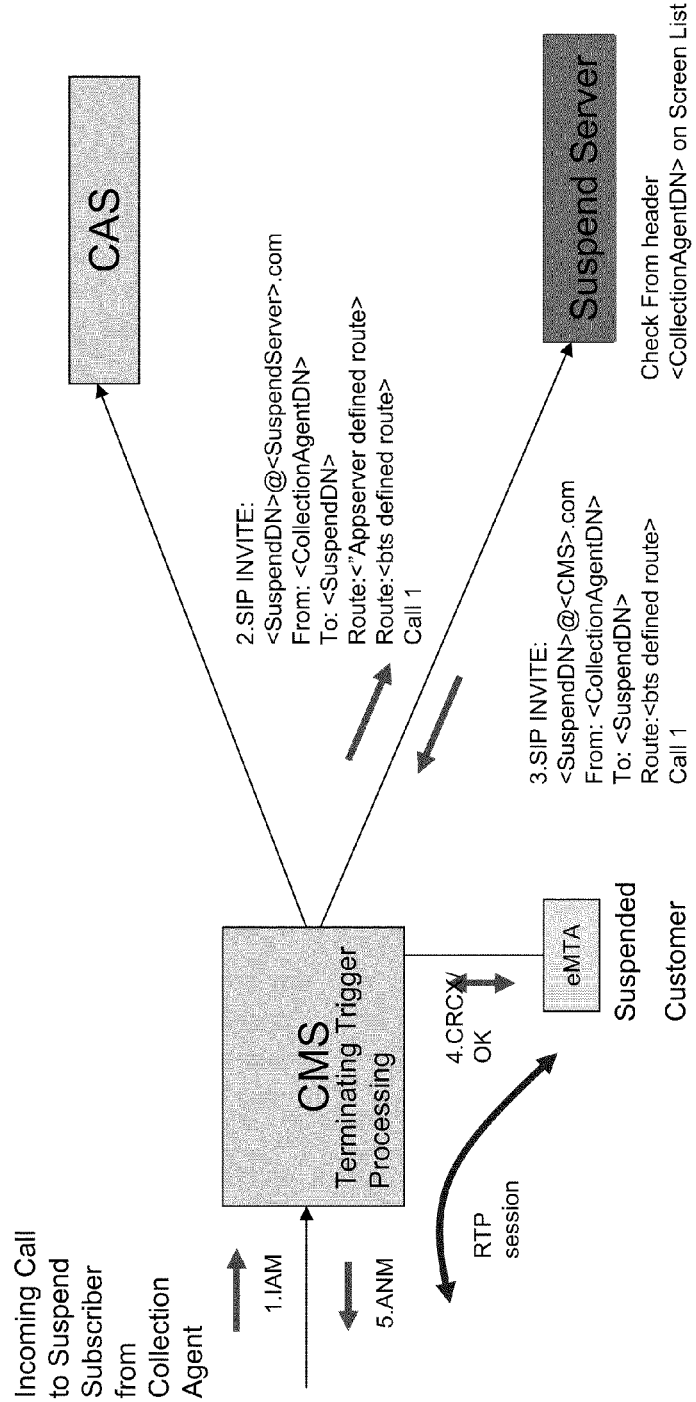
Figure 8:
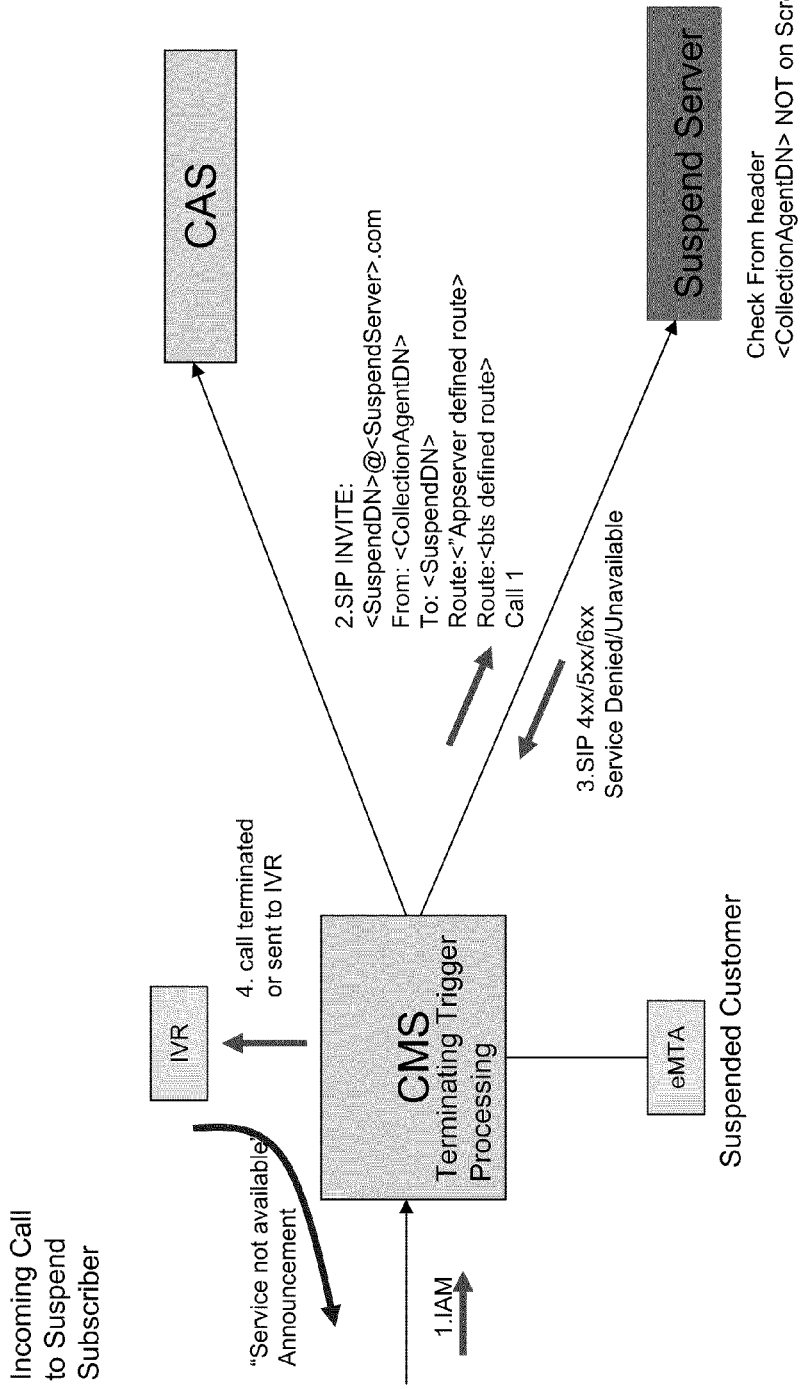

The Session Router may be configured to act as a programmable proxy to implement the SICS Application Server (AS). Algorithms may be utilized to meet the requirements for call processing required by the various Call Agents. This algorithms may have any number of different behaviors. For example, FIG. 5 shows the suspend announcement from the CMS. FIG. 7 shows the call processing when the call is allowed. and FIG. 8 shows an example of the suspend announcement from the interactive voice response (IVR) server when the call is disallowed. In these examples, SICS or non-SICS calls may enter the SRP on the same sip-interface. This sip-interface may be associated with a realm that has an associated sip-manipulation parameter. Calls may be processed through this sip-manipulation.

In some embodiments, a local policy is utilized for call routing. For example, for calls that were routed to an interface on the telecommunication provider's network may be redirected on the next hop by consulting an ENUM system such as the SICS announcement server ENUM domain. The results of the ENUM lookup may be based on a determination of whether caller is allowed or disallowed. For allowed calls, the ENUM lookup may be configured to return a naming authority pointer (NAPTR) record that routes the call to the original calling domain name via a loopback interface configured on the SIP route proxies (SRP). Embodiments may process the allowed calls as follows, for example: A routine stores the header value as well as the hostname of the CMS that sent the call, for example.

The original route is deleted which is no longer needed.

The header-rule routine adds a new route header with the value of the former-route header.

The header-rule request routine modifies the request of the invite. It may be configured to replace the current host-portion with the hostname of the CMS that sent the call and to remove the calling domain name from the user-portion.

The header-rule routine modifies the header by replacing the host-portion of the URI with the hostname of the CMS that sent the call.

The next hop of the call may be determined by the new route header. Further, since the new route header contains the hostname of the originating CMS, the call may also be routed back to the originating CMS.

For disallowed calls, the ENUM lookup may return a Name Authority Pointer (NAPTR) record that routes the call to a suspended domain name via a hostname. The hostname may be configured to be a session-group on the SIP route proxy, which contains a list of equally weighted CMSs through which the disallowed call can be routed. The SIP route proxy may then be configured to choose the appropriate CMS and routes the call there.

A collection of 10 least-loaded switches may be selected as the suspend announcement CMS (SA-CMS). The servers providing suspend announcement may be configured with a dummy DN. The DN may be put in the "Suspended" administration status. Since SRP does not have the capability to modify the user part of the Invite messages sent to SA-CMS, the dummy DN may be the same across all of the switches that have been selected as SA-CMS. Any reserved number, 9999999999 for example (10 9's), may have been chosen as the dummy DN. Disallowed callers will hear the suspended service announcement, such as "The number you dialed is not accepting call at this time."

A nationwide allowable calling number list may be maintained. Instead of determining the possible callers for specific markets and regions and trying to match region-based call centers/collection agencies information to server-specific allowable calling lists, a nationwide list may be maintained on ENUM (or another telephone number management server) to screen calls to all the markets. The numbers on the list may be able to call the soft disconnect customers in any markets.

FIG. 4 illustrates the call processing flow in the detailed example for a call from a calling number on the list as follows:

Step 1: a call is received from a network such as the PSTN or on-net to a suspended subscriber on a switch Step 2: TAT_1 is invoked in call processing Step 3: a SIP Invite is sent to SRP as a result of TAT_1 with the well-formed Request-URI, To, From, and Route headers.

Step 4: Based on Hostname of the incoming SIP Invite Request URI, SRP replace Request URI with "<SuspendDN>@<CP>", pops the first Route header, store the second Route header and the rest of header information, and formulate an ENUM query Step 4a: A variation for step 4 is when the caller blocks the caller ID. For an anonymous call, From header is replaced with PAI Step 5: SRP queries ENUM for a NAPTR record with domain=SICS and key=<CallingDN>

Step 6: ENUM finds a record and formulates a positive response

Step 7: ENUM responds with a loop back address on SRP specifically for SICS application.

Step 8: SRP, based on the positive response from ENUM, retrieves SIP Invite information formulated in Step 4

Step 9: SRP responds to switch with a well-formed SIP Invite

Step 10: Switch completes the call to the suspended endpoint.

FIG. 5 illustrates the call processing flow in the detailed example for a call from a calling number which is not on the list.

Step 1: a call is received from PSTN or on-net to a suspended subscriber on a switch Step 2: TAT_1 is invoked in call processing Step 3: a SIP Invite is sent to SRP as a result of TAT_1 with the well-formed Request-URI, To, From, and Route headers.

Step 4: Based on Hostname of the incoming SIP Invite Request URI, SRP replace Request URI with "<SuspendDN>@<CP>", pops the first Route header, store the second Route header and the rest of header information, and formulate an ENUM query Step 4a: A variation for step 4 is when the caller blocks the caller ID. For an anonymous call, From header is replaced with PAI Step 5: SRP queries ENUM for a NAPTR record with a domain=SICS and key=<CallingDN>

Step 6: ENUM does not find a record, matches one of the wildcard records and formulates a "negative" response Step 7: ENUM responds with URI DummyDN at a SICS domain. The SICS domain points to a Session Agent Group consisting of a collection of Safari switches that will be used to play suspend announcements.

Step 8: SRP selects a member from the SAG by round-robin and formulate an Invite with R-URI=<DummyDN>@<CMSx>

Step 9: SRP proxies the SIP Invite to a suspend announcement CMS (SA-CMS)

Step 10: Based on the suspended status of the DummyDN, CMSx plays the suspend announcement Step 11: CMSx sends a Session Progress with the SDP information for the announcement Step 12: Suspend announcement is played to the calling party Exemplary configurations may use any of a number of different switches such as, for example, a Cedar Point Safari switch and/or an Acme Packet suspend server. It will be clearly understood to one of skill in the art that the invention is not limited to any particular brand of switch or server.

Although exemplary embodiments have been described in terms of telephone services over a network such as a wireless, twisted pair, cable, fiber, coax, and/or fiber/coax network, embodiments disclosed herein may be utilized for any type of content or network, including data audio and video; and any type of communications system, including RF transmission, wireless broadcast, wireless networks, internet protocols, etc.

One or more aspects of the disclosures may be embodied in computer-usable data and computer-executable instructions, such as in one or more program modules, executed by one or more computers, processors, or other devices. Generally, program modules include routines, programs, objects, components, data structures, etc., that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Embodiments may be implemented in software to be provided to existing central system systems and servers, and to interface devices and DVRs. Further, embodiments may be embedded in the hardware or firmware of new equipment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
   creating a list that comprises entries indicative of calling numbers allowed to call one or more suspended users;
   sending the list to a server; and
   configuring an account of a suspended user with a termination attempt trigger;
   detecting a calling number calling the suspended user, wherein the account of the suspended user is configured with the termination attempt trigger;
   sending, to the server, a query with the calling number that requests the server attempt to find an entry of the list that matches the calling number; and
   receiving a response to the query that includes a parameter either indicating that the calling number is allowable or indicating that the calling number is not allowed.

2. The method of claim 1 further comprising:
   sending the response to a Signal Route Proxy (SRP) server; and
   sending from the SRP server a Session Initiation Protocol (SIP) invite to either a first call management server (CMS) or a second CMS depending on whether the parameter indicates that the calling number is allowable or indicates that the calling number is not allowed.

3. The method of claim 2 further comprising:
   sending an announcement from the second CMS responsive to the SIP invite.

4. The method of claim 1 further comprising:
   creating the list responsive to a dynamic calling list maintained by a call center.

5. The method of claim 1 wherein sending the query includes sending an Electronic Numbering (ENUM) query and wherein receiving the response to the query includes receiving an ENUM response.

6. The method of claim 1, wherein each entry of the list is indicative of an allowed calling number that is able to call all suspended users of a nationwide network.

7. An apparatus comprising:
   one or more processors; and
   memory storing executable instructions that, when executed, cause the apparatus to receive a list that comprises entries indicative of calling numbers allowed to call one or more suspended users,
      receive a query with a calling number that requests the apparatus attempt to find an entry of the list that matches the calling number, wherein the calling number is attempting to call a suspended user,
      determine whether the list includes an entry for the calling number, and
      send a response with a parameter either indicating that the calling number is allowable or indicating that the calling number is not allowed.

8. The apparatus of claim 7 wherein the response is sent to a Signal Route Proxy (SRP) server.

9. The apparatus of claim 7 wherein the list is received responsive to a change in allowable calling numbers.

10. The apparatus of claim 6 wherein the query includes an Electronic Numbering (ENUM) query and wherein the response includes an ENUM response.

11. The apparatus of claim 7, wherein each entry of the list is indicative of an allowed calling number that is able to call all suspended users of a nationwide network.

12. A method comprising:
    receiving a list that comprises entries indicative of calling numbers allowed to call one or more suspended users;
    configuring an account of a suspended user with a termination attempt trigger;
    detecting a calling number calling the suspended user, wherein the account of the suspended user is configured with the termination attempt trigger;
    receiving, at a telephone number management server, a telephone number management server query with the calling number that requests the telephone number management server attempt to find an entry on the list that matches the calling number; and
    sending a telephone number management server response to the telephone number management server query, wherein the telephone number management server response includes a parameter either indicating that the calling number is allowable or indicating that the calling number is not allowed.

13. The method of claim 12 further comprising:
    sending the telephone number management server response to a signaling route proxy server; and
    sending from the signaling route proxy server a signaling invite to either a first call management server (CMS) or a second CMS depending on whether the parameter indicates that the calling number is allowable or indicates that the calling number is not allowed.

14. The method of claim 13 further comprising:
    sending an announcement from the second CMS responsive to the signaling invite.

15. The method of claim 12 further comprising:
    creating the list responsive to a dynamic calling list maintained by a call center.

16. The method of claim 12, wherein each entry of the list is indicative of an allowed calling number that is able to call all suspended users of a nationwide network.

17. A system comprising:
    a call center configured to generate a list that comprises entries indicative of calling numbers allowed to call one or more suspended users; and
    a telephone number management server configured to receive the list,
       receive a query with a calling number that requests the telephone number management server attempt to find an entry on the list that matches the calling number,
       determine whether the list includes an entry for the calling number, which is calling a suspended user, and
       send a response to the query that includes a parameter either indicating that the calling number is allowable or indicating that the calling number is not allowed.

18. The system of claim 17 further comprising:
    a first call management server and a second call management server; and
    a signaling route proxy server configured to receive the telephone number management server response and send a signaling invite to either the first call management server or the second call management server depending on whether the parameter indicates that the calling number is allowable or indicates that the calling number is not allowed.

19. The system of claim 18 wherein the second call management server is configured to send an announcement message responsive to the signaling invite.

20. The system of claim 17 wherein the call center is configured to dynamically generate the list responsive to changes in allowable calling numbers.

* * * * *